United States Patent [19]
Slotine et al.

[11] Patent Number: 5,266,875
[45] Date of Patent: Nov. 30, 1993

[54] TELEROBOTIC SYSTEM

[75] Inventors: Jean-Jacques E. Slotine; Günter D. Niemeyer, both of Cambridge, Mass.

[73] Assignee: Massachusetts Institute of Technology, Cambridge, Mass.

[21] Appl. No.: 704,946

[22] Filed: May 23, 1991

[51] Int. Cl.$^5$ ............................................. G05B 11/00
[52] U.S. Cl. .................... 318/568.11; 318/568.1; 318/628; 318/568.16; 395/95; 395/99; 901/9
[58] Field of Search .............................. 318/560–632, 318/660; 395/80–99; 901/3, 5, 9, 12, 13, 15, 17–20

[56] References Cited

U.S. PATENT DOCUMENTS

| | | | |
|---|---|---|---|
| 4,510,574 | 4/1985 | Guittet et al. | 318/628 |
| 4,661,032 | 4/1987 | Arai | 901/9 |
| 4,837,734 | 6/1989 | Ichikawa et al. | 395/93 X |
| 4,853,874 | 8/1989 | Iwamoto et al. | 395/99 |
| 5,019,761 | 5/1991 | Kraft | 318/568.11 |
| 5,053,975 | 10/1991 | Tsuchihashi et al. | 395/99 |
| 5,086,400 | 2/1992 | Hayati et al. | 395/95 |
| 5,105,367 | 4/1992 | Tsuchihashi et al. | 395/99 |

OTHER PUBLICATIONS

Anderson, R. J. and Spong, M. W., *Bilateral Control of Teleoperators with Time Delay*, Proceedings of the 27th Conference and Control, Austin, TX, Dec. 1988.
Anderson, R. J. and Spong, M. W., *Bilateral Control of Teleoperators with Time Delay*, I.E.E.E. Transactions on Automatic control, vol. 34, No. 5, pp. 494–501, May 1989.
Anderson, R. J. and Spong, M. W., *Asymptotic Stability for Force Reflecting Teleoperators with Time Delay*, Proceedings of the I.E.E.E. Conference on Robotics and Automation, Scottsdale, AZ, 1989.
Anderson, R. J., *Improved Tracking for Bilateral Control of Teleoperators with Time Delay*, Presented at the A.S.M.E. Winter Annual Meeting, Dallas, TX, 1990.
Sheridan, T. B., *Telerobotics*, Automatica, vol. 25, No. 4, pp. 487–507, 1989.

*Primary Examiner*—Paul Ip
*Attorney, Agent, or Firm*—Wolf, Greenfield & Sacks

[57] ABSTRACT

A telerobotic system provides a means for transmitting data between a master and a remote slave unit with a time delay therebetween. The master and slave unit form a closed loop in which motion commands are transmitted from the master to the slave and force data is transmitted back from the slave to the master. Stability is obtained over time delay by means of transforming the motion data into a wave representation in transmission between the master and slave. The signal from the master to the slave may be characterized generally as $u = F + b\dot{x}$ while the signal from the slave to the master may be characterized generally as $v = F - b\dot{x}$ where F equals the force imparted by the environment, $\dot{x}$ equals the velocity commanded by the master, and b is a characteristic wave impedance.

22 Claims, 9 Drawing Sheets

TELEROBOTIC SYSTEM

FIELD OF THE INVENTION

This invention relates to a system for stabilizing the response of time delayed transmissions in a loop, and more particularly, to a system for stabilizing force reflecting telerobotic control transmissions.

BACKGROUND OF THE INVENTION

Telerobotics involves the manipulation and control of objects and devices over a long distance. The user controls a remote device by means of control signals transmitted over a particular medium. In order to enhance the user's ability to "feel" the effects of his or her control inputs, force reflection is often included in which the remote device feeds force or other motion relative signals back to the user so that control adjustments may be made based upon the remote device's state. Such telerobotic system have been employed variously in underwater applications by means of control signals carried by sound waves, in underground environments and have been contemplated for use in long range space applications utilizing radio waves as well as in microscopic environments such as remote microsurgical instruments. A generalized diagram of such a system is illustrated in FIG. 1.

As long as time delays in the transmission or communication 20 of control signals to the remote telerobotic device or "slave" 22 from the "master" system 24 and from the remote device 22 back to a master system 24 (controlled by the user 26) remain relatively small, the actions of the user 26 and remote device's effects on the environment 28 are relatively synchronized. Thus the system, while still retaining a tendency toward instability, remains controllable in most instances. A human user 26 generally exhibits a quantifiable reaction time (approximately 1/10 of a second) and, thus, as long as time delays remain in this range, the system is transparent, meaning that the user is unaware of any time delay. As such, a control movement that is quickly followed by a remote device force response at the master system 24 or other motion state feedback to the user does not effect the user's ability to operate the system properly.

However, when dealing with particularly long operating ranges such as in space, or when the transmission medium is slower than the speed of light such as for sound waves, time delays T may become significant. When these time delays become somewhat greater than normal human reaction times (i.e. between 0.1 and 1-2 seconds), then the system becomes exponentially more difficult to utilize. Imagine placing a control movement (velocity in this example) to a remote arm while expecting to feel contemporaneous force contact in the manipulator unit. Since there is a time delay T in communication 20 to and from the device (see FIG. 2), the control movement $X_m$ is delayed and the contact force $F_s$ does not return to the user immediately from the remote device 22. As such, the user 26 continues to attempt to move the device forward using a manipulator at the master system 24 intuitively waiting for a sensation of contact response (delayed $F_m$). Since the remote device response signal $F_s$ is delayed by one second or more, the device has had one or more seconds to move further than anticipated. As such, the device has already contacted and is now pushing very hard on the object before the user receives any force feedback. The user will be pushed back hard by the master manipulator when receiving the very high force feedback which has been delayed by a second or more. This hard motion of the manipulator then propagates through the system with appropriate delays and the system overcompensates by moving away from the object. The process continues as the system quickly oscillates out of control and becomes unusable over a long distance. See, for example, the simulation graph of FIG. 3.

In the past, the problem of such instability has been solved for long distance time-delayed closed loop systems by means of providing damping at one or both of the operator device ends of transmission. As such, a control movement transmitted by the user causes a slow response in the device that tends to cancel out the effect of time delay. Similarly, the force reflected by the device is received by the operator slowly again cancelling out the effects of the time-delayed operation. In particular, a slow force reflection makes the operator feel like less force is present than actually felt by the device and, thus, the system is less prone to overcompensate.

The problem with such extreme damping is that it still cannot guarantee stability in all systems and at all times. Rather, in particular cases, such as when a system phase shift is greater than 180 degrees, the system may remain unstable and incapable of performing useful work.

Alternatively, systems in which response could be predicted were provided with force prediction feedback systems to provide the user with an immediate response sensation at his manipulator. The problem with such a system is that it required certain knowledge of the environment. This limited versatility of the system. Additionally, if prediction assumptions were, in fact, incorrect the system would prove highly unstable.

SUMMARY OF THE INVENTION

It is, therefore, an object of the present invention to provide a telerobotic transmission system that guarantees stability over all time delays without regard to specific system parameters.

It is another object of this invention to provide a system that achieves the best possible performance given the actual delay and that degrades slowly and steadily as a transmission time delay increases.

It is another object of this invention to provide a system that may be used in a variety of teleoperational configurations including a symmetric telerobotic system in which an operator and remote device include manipulators and controllers for receiving and transmitting motion.

It is yet another object of this invention to provide a system that ma be tuned with ease to the particular operating parameters of a given teleoperational system for greatest system effectiveness.

A stable robotic system according to this invention provides a means for transmitting data to and from a pair of remote points. The remote points may include a master manipulator controlled by an operator and a slave manipulator that performs a remote operation in an environment. In one embodiment, the master manipulator transmits velocity signals to the slave manipulator and the slave manipulator returns force signals representative of the manipulators current state to the master manipulator. To account for time delays in transmission, the master manipulator includes a means for transforming the velocity signals into a wave variable representation. In particular, the wave variable u may be characterized as $u = F + b\dot{x}$. The wave variable is transformed back into a velocity command proximate the remote slave manipulator. The slave manipulator includes a means for transforming its force data into a wave representation v that may be characterized $v = F = b\dot{x}$. For both the representations of u and v, b may be considered a function representing a characteristic wave impedance chosen by the operator to best suit the task needs. The wave representation v from the slave manipulator unit is transformed by the master manipulator unit back into a force value.

In a preferred embodiment, the system may include at least one impedance controller for matching impedance of the manipulator to the characteristic wave impedance b. The system may be further tuned to optimize performance taking into account differences in master and slave inertia as well as internal mechanical damping.

BRIEF DESCRIPTION OF THE DRAWINGS

The foregoing and other objects and advantages of the invention will become more apparent with reference to the following drawings and detailed description in which.

DETAILED DESCRIPTION OF PREFERRED THE EMBODIMENT

Figure 1:
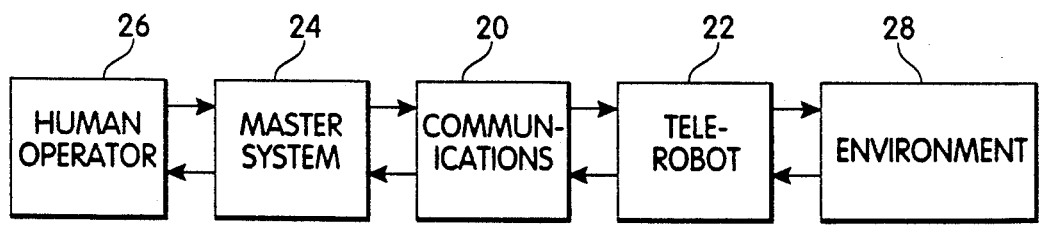
FIG. 1 is a block diagram of a standard force reflecting telerobotic system according to the prior art.
Figure 2:
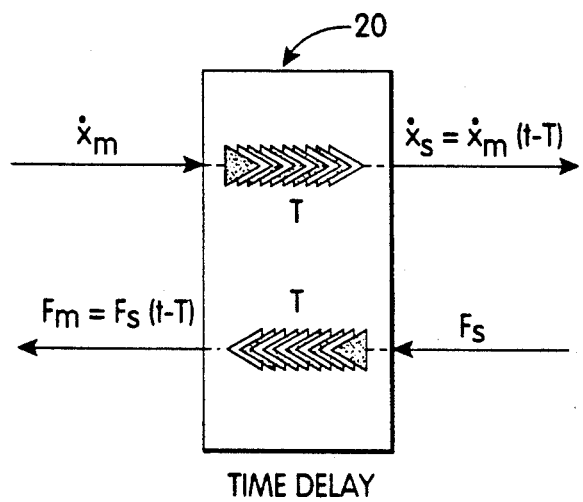
FIG. 2 is a block diagram of the effect of a time delay on velocity and force transmissions in the communications of the system of FIG. 1.
Figure 3:
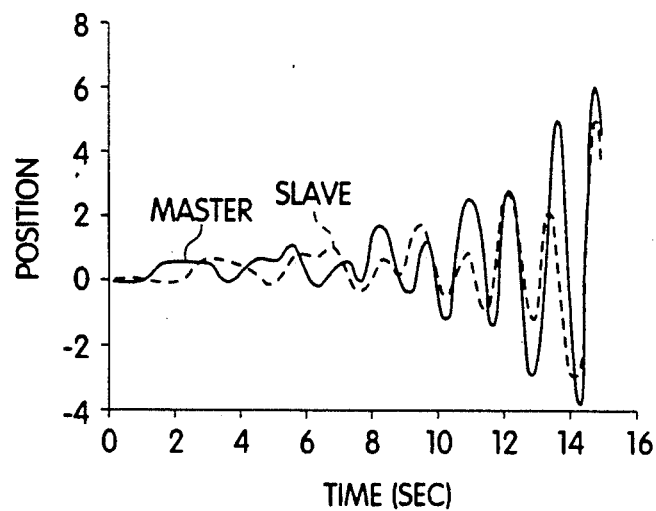
FIG. 3 is a graphical representation of the response of master and slave units given a system time delay as set forth in FIG. 2.

A telerobotic system, as stated above, may be illustrated as shown in FIG. 1. The system is, thus, divided into its various elements with communications 20 between a master system 24 and a slave or telerobotic system 22 being separate. A stable communications system 20 may, thus, be modeled using concepts of passivity. As such, we define the power P entering the system as a scalar product between an input vector x and the output vector y of the system. The power does not necessarily correspond to any actual physical power in the event that input and output variables are not chosen to be velocity and force. For a system to be passive, the power passing through the system must be either stored as energy E or dissipated as $P_{diss}$ within the system. And the system will obey the equation:

$$P = x^T y = \frac{dE}{dt} + P_{diss} \tag{1}$$

Thus the total energy supplied by the system up to a time t is limited to the initial stored energy. In other words, no energy is supplied by the system itself. Using the stored energy as a Lyapunov-like function, one can analyze the stability of the system and show that, without external input, a passive system is naturally stable.

A passive system may also be combined with one or more additional passive systems connected either in a feedback or parallel configuration to obtain an overall passive system. The stored energy and power dissipation of the combined system is obtained by adding the individual functions of both systems. In the case of force reflecting teleoperation, using a passive control structure allows the manipulation of any given passive environment without loss of the overall stability of the system. Thus, by formulating a passive system for the telerobotic configuration, one may guarantee stability regardless of any unknown factors (e.g. environmental factors) that may be encountered by the system during actual operation.

Note that while passivity is clearly motivated by physical intuition, it can apply to systems having arbitrary input and output variables of the same dimension. Thus, the "power" and "energy" functions used herein need not correspond to any real physical quantities. Rather, other properties may be chosen that behave like power and energy. However, the terms power and energy will be used herein for simplicity.

Any passive system can also be analyzed in terms of a wave representation. In such a wave representation, one may define the total power flow through the system as a difference between two positive terms representing the input power and the output power of the system. These two parts may be associated directly with an input and an output wave, the amplitudes of which are denoted by the wave variables u and v. The wave variables may be obtained from the power variables $\dot{x}$ and F (velocity and force). The wave variables are in particular obtained through the following transformations:

$$u_l = \frac{1}{\sqrt{2b}} (F_l + b\dot{x}_l) \tag{2}$$

$$v_l = \frac{1}{\sqrt{2b}}(F_l - b\dot{x}_l)$$

The positive scalar value b used above denotes the characteristic wave impedance. This value is important in determining the transient behavior of the system and will be described further below.

In a telerobotic system, the transmission between the operator or master unit and the remote device or slave unit may be characterized in terms of a velocity or motion control from the slave to the master, and a responsive force value returned from the slave to the master to be felt by the operator as part of the controlling process. Thus, the system takes a form of a closed loop with the operator acting on one (master) end of the loop and the environment acting on the other (slave) end. By using passivity concepts, one may derive the following transmission law which is somewhat similar to that in a simple electrical transmission line:

$$\dot{x}_{sd}(t) = \dot{x}_m(t-T) - \frac{1}{b}(F_s(t) - F_{md}(t-T)) \quad (3)$$

$$F_{md}(t) = F_s(t-T) + b(\dot{x}_m(t) - \dot{x}_{sd}(t-T))$$

Where $\dot{x}_{sd}$ is the desired corresponding slave manipulator velocity while $F_{md}$ is the desired master manipulator force value returned from the contact $F_s$ of the slave with the environment. As noted above, by representing the force F and velocity x values as wave variables u and v respectively, one may derive such a passive model for transmission simply by selecting:

$$v_s(t) = u_m(t-T) \quad v_m(t) = u_s(t-T) \quad (4)$$

Figure 4:
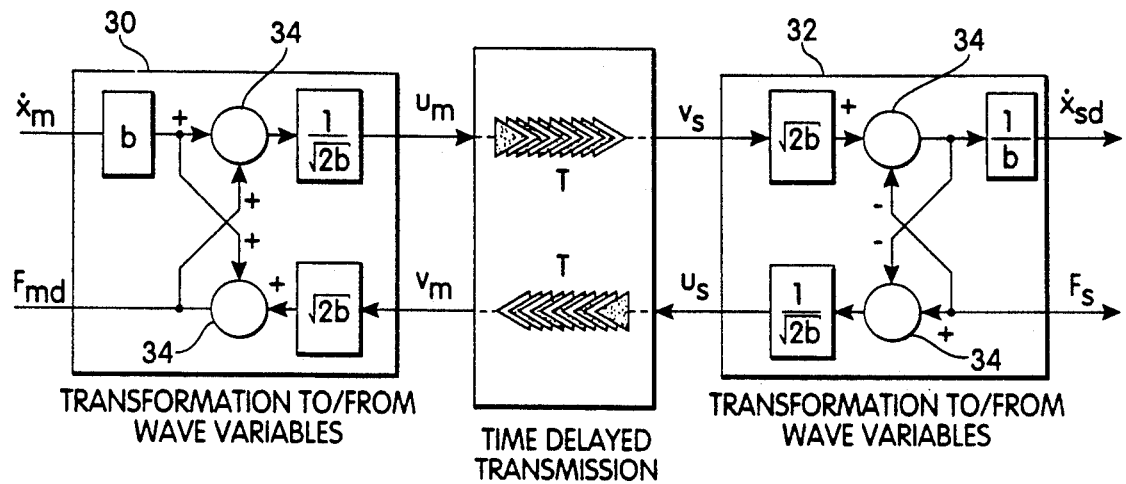
FIG. 4 is a block diagram of a basic system for transforming velocity and force values into and from wave variables.

The above wave mechanical equations when combined with the wave transformations yield a system as depicted in FIG. 4. In the depicted system, T represents the time delay and transmission between the master and slave units. Each of the master and slave wave transformation blocks 30, 32 include feedback 34 according to this invention in order to derive desired wave transformations from input velocity and force values. Both the master and slave units are also assumed to be back drivable. Note that the above-described wave transmission characterization is defined herein for one degree of freedom. The system is applicable to multiple degrees of freedom by providing the appropriate feedback response within each of the master and slave manipulator units and by structuring b as an appropriate impedance tuning function for multiple degrees of freedom.

Figure 5:
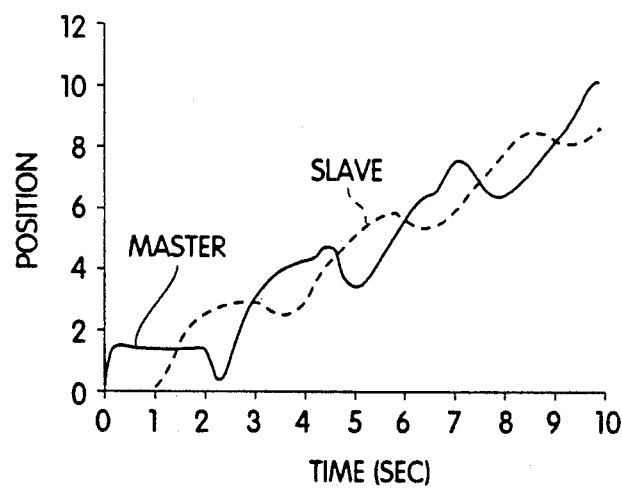
FIG. 5 is a graph showing the response of a basic wave variable transformation system according to FIG. 4.

As noted above, the scalar quantity b is used to determine the characteristic wave impedance in the wave mechanical representation of transmission according to this invention. In physical systems, waves become reflected at points of transition between different impedances. Similarly, in a system according to this invention utilizing a wave characterization, wave reflections may occur at the junction of each of the master and slave units with the transmission medium. These reflections will serve to corrupt data transmission since the operator must determine whether the incoming data is merely a reflection of his sent transmission or an actual reflected signal from the remote slave unit. These wave reflections also result in oscillatory behavior similar to that found in a standing wave phenomenon in physical wave transmissions. The response of a system utilizing wave transmission theory, but having untuned impedance resulting in reflections is depicted in FIG. 5. In this system, the position of both the master and slave drift steadily from an original point. Such motion is similar to a constant center of mass motion.

Figure 7:
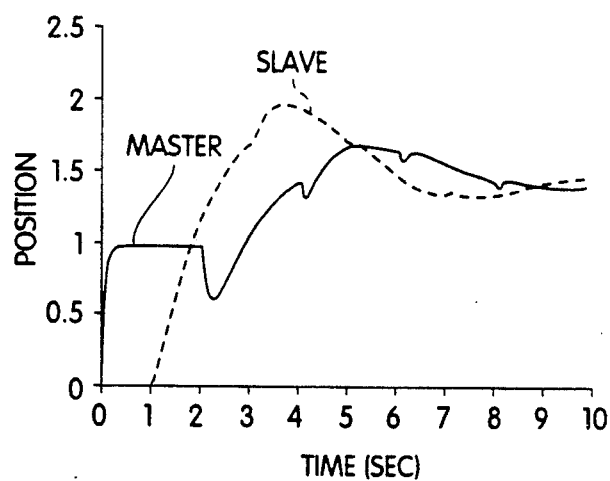
FIG. 7 is a graph showing the response of an impedance controlled system according to FIG. 6.

However, adding a center of mass damping to the system provides a response as shown in FIG. 7 which retains fixed positioning.

To avoid undesired reflections, the impedance b of the wave transmission must be matched to the impedance of the remaining system on both sides. The process of matching impedance may be performed by providing impedance control to obtain a desired position and velocity in the slave manipulator. However, force control of the master manipulator prevents perfect impedance matching and, thus, necessitates alternative approaches to obtain a desired tuning.

Figure 6:
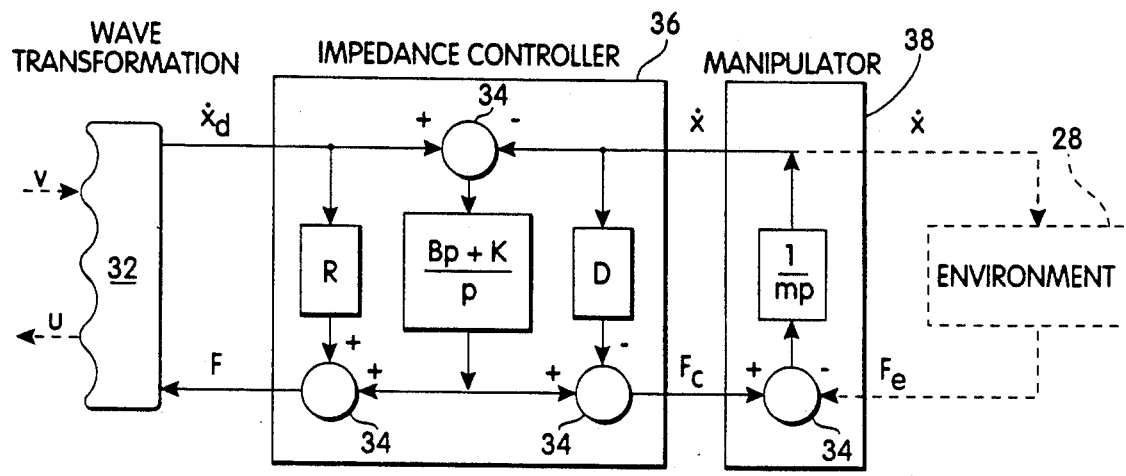
FIG. 6 is a block diagram detailing an impedance controller for further stabilizing a wave transformation system according to this invention.

The apparent impedance as viewed with respect to the transmissions is described by the transfer function between velocity input and force response according to this invention. By placing the slave manipulator under impedance control in a manner shown in FIG. 6, the transfer function for one degree of freedom is given by:

$$\frac{F}{\dot{x}_d} = R + \frac{(Bp + K)(mp + D)}{mp^2 + (B+D)p + K} \quad (5)$$

wherein p is the Laplace operator which defines d/dt. E.G., 1/mp is the dynamics of a simple mass which integrates the applied force and determines the motion according to Newton's Law. K is the position gain, B is controller damping, D is environmental damping and R is damping (including friction) to account for differences between master and slave units. The variable m is the equivalent mass or inertia of the local manipulator such that a given acceleration translates into a force via Force = ma. To better tune the system, each of the master and slave unit may include an impedance controller 36 between the transmission medium and the manipulator. One such impedance controller according to this invention for use with the slave unit manipulator 38 is depicted in block form in FIG. 6. This impedance controller 36 implements the transfer function of equation 5. The gains are chosen such that:

$$K = \lambda B = \lambda^2 m; \quad B = D = \lambda m; \quad R = b - B \quad (6)$$

wherein $\lambda$ equals the bandwidth or "stiffness" of the manipulator. The bandwidth may be selected for a given system based upon the type of response speed required. Again, the damping gain R relates to the damping necessary to match a relatively small inertia manipulator on the master side to a relatively large inertia manipulator on the slave side or vice versa. This relationship allows separate tuning of b and B which would otherwise have to be equal. To maintain passivity of the system, R must be non-negative and, therefore, $b \geq B$. The damping coefficient D relates to internal and environmental friction encountered by the manipulator and provides appropriate center of mass damping, allowing a non-drifting positional response as shown in FIG. 7. For the purposes of impedance matching, the manipulator is assumed to be in free motion with no environmental forces considered. In this state, no information must be returned to the operator and no wave reflections should occur since no force is encountered by the slave manipulator. When the manipulator finally makes contact or experiences other forces, the information flow to the operator occurs and a returning non zero wave variable is transmitted.

Figure 8:
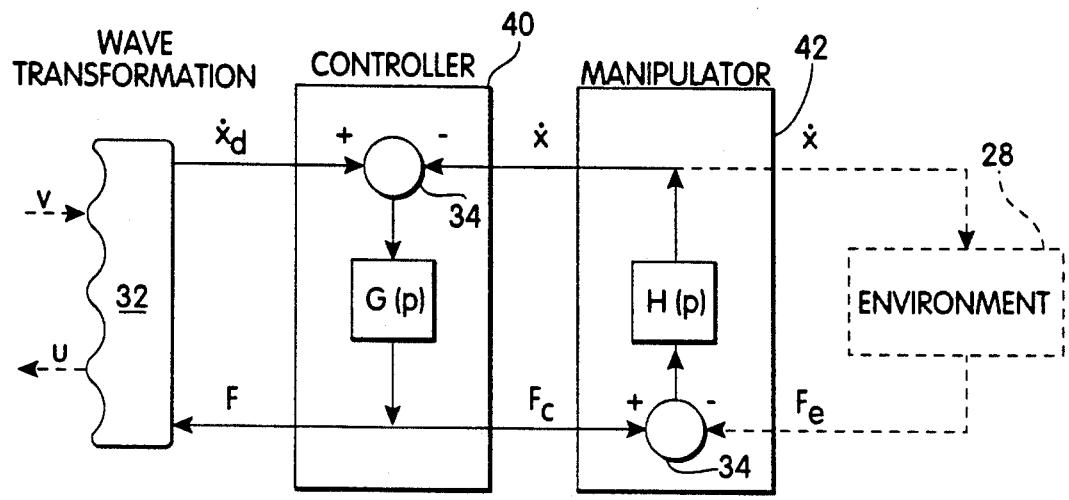
FIG. 8 is a block diagram of a generalized impedance control remote device according to this invention.

A generalized structure for a remote slave system under velocity control is depicted in FIG. 8. The general controller 40 transfer function G(p) should be selected as:

$$G(p) = \frac{b}{1 - bH(p)} \quad (7)$$

with H(p) being the manipulator 42 transfer function, assuming a single degree of freedom.

Figure 9:
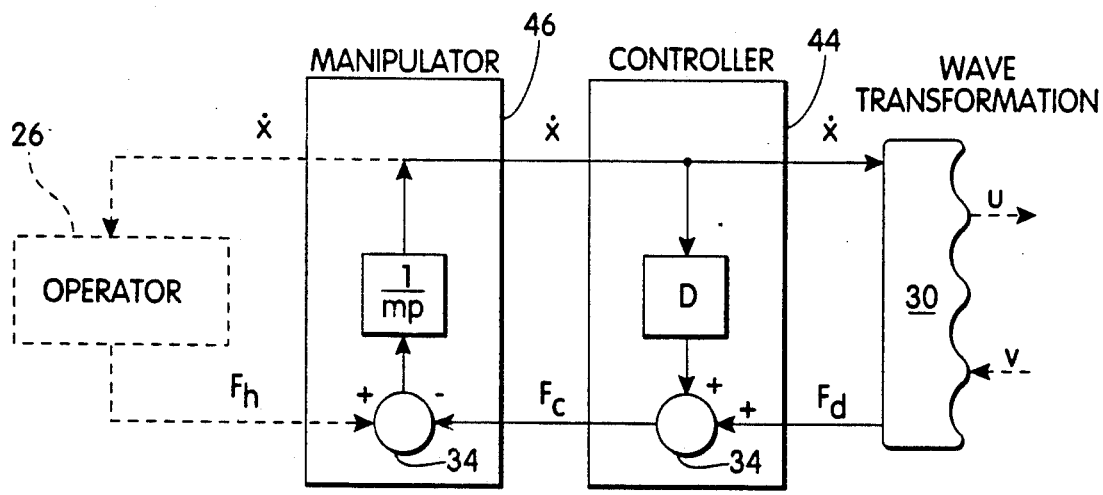
FIG. 9 is a block diagram of a force controller for a master manipulator according to this invention.

As noted, impedance of the operator manipulator cannot be matched perfectly based upon force control signals. FIG. 9 depicts a block structure for a force controller 44 and manipulator 46 for the master unit. The transfer function, according to this structure between force $F_d$ and the velocity output $\dot{x}$ for one degree of freedom is:

$$\frac{\dot{x}}{F_d} = -\frac{1}{mp + D} \quad (8)$$

No selection of D causes the transfer function to simplify to the constant damping gain required to match the wave impedance. Thus, to select the best gain, one must examine the transfer function between the wave input v and the wave output u directly. The following equation governs:

$$\frac{u}{v} = \frac{mp + D - b}{mp + D + b} \quad (9)$$

Figure 10:
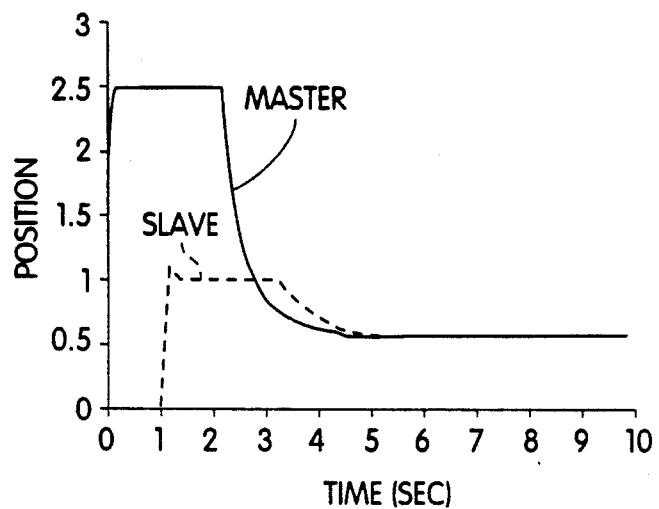
FIG. 10 is a graph illustrating the response of an impedance matched system according to FIGS. 8 and 9.

To minimize the gain of the above equation, the damping gain D should equal the wave impedance b so that reflections are avoided at low frequencies. At high frequencies, however, this transfer function always carries a value of one. Appropriate tuning of the system for velocity on the slave side and force on the master side is shown in FIG. 10. Note that upon contact with the environment the system quickly stabilizes and equalizes master and slave position values.

Figure 12:
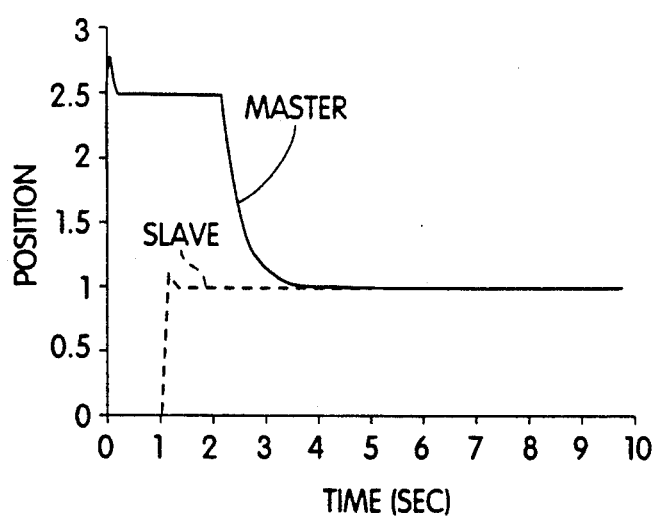
FIG. 12 is a graph illustrating the response of a system according to FIG. 11.
Figure 11:
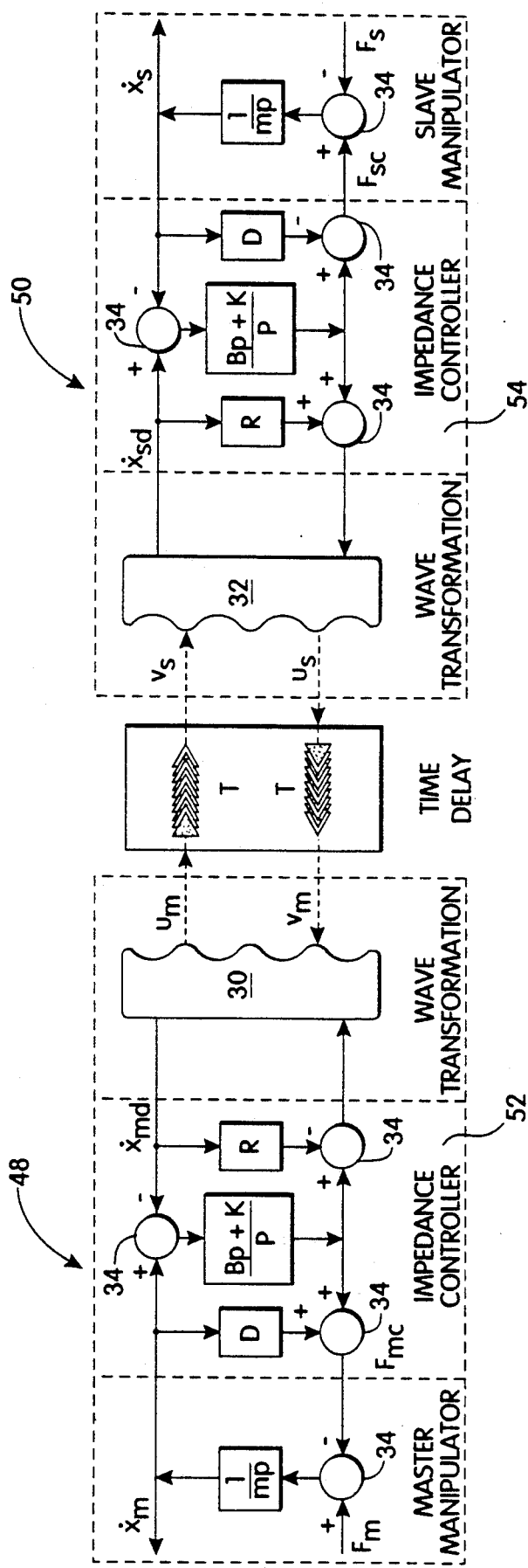
FIG. 11 is a block diagram of an overall system according to this invention including velocity control upon both sides thereof.

The complete damped master/slave system according to this invention utilizing impedance control of both master and slave manipulators is depicted in FIG. 11 and its response is shown in FIG. 12. Note that this system is symmetric, converting force signals from both the operator side $F_m$ and environment side $F_s$ into appropriate velocity (position relative) commands. That is, both wave transformations at the local (master) and remote (slave) sites use force information to interpret the wave data, which is received from communications, as position-relative commands at their respective locations. As such, the communication between the master unit 48 and slave unit 50 is defined by the following equations:

$$u_m = B_m \dot{x}_m - (B_m + R_m - b)\dot{x}_{md} + K_m \tilde{x}_m \quad (10)$$

$$-u_s = B_s \dot{x}_s - (B_s + R_s - b)\dot{x}_{sd} + K_s \tilde{x}_s$$

$$\dot{x}_{md} = \frac{1}{B_m + R_m + b}(B_m \dot{x}_m + K_m \tilde{x}_m - u_s(t - T))$$

$$\dot{x}_{sd} = \frac{1}{B_s + R_s + b}(B_s \dot{x}_s + K_s \tilde{x}_s + u_m(t - T))$$

wherein $\tilde{x}$ is the position error and $\dot{\tilde{x}}$ is the velocity error and further, $\tilde{x}_m = x_m - x_{md}$ and $\tilde{x}_s - x_{sd}$. Additionally, the impedance controllers according to this system provide the following forces:

$$F_{mc} = D_m \dot{x}_m + B_m \dot{\tilde{x}}_m + K_m \tilde{x}_m$$

$$-F_{sc} = D_s \dot{x}_s + B_s \dot{\tilde{x}}_s + K_s \tilde{x}_s \quad (11)$$

Note that as the time delay T reduces to zero, each of the impedance controllers 52, 54 connect to form a single impedance. Similarly, when the delays are small compared to the typical reaction time of the operation, as discussed above, the system is relatively transparent.

If one chooses the gains to avoid wave reflections as discussed above, the dynamic equations for the remote slave unit 50 are then:

$$\dot{x}_s = \frac{\lambda_s}{p + \lambda_s} \frac{1}{2b} v_s - \frac{p + \lambda_s \frac{B_s}{2b}}{(p + \lambda_s)^2} \frac{1}{m_s} F_s \quad (12)$$

$$u_s = \frac{\lambda_s}{p + \lambda_s} F_s$$

Further, when including the desired velocity, the equation becomes:

$$\dot{x}_s = \frac{\lambda_s}{p + \lambda_s} \dot{x}_{sd} - \frac{p}{(p + \lambda_s)^2} \frac{1}{m_s} F_s \quad (13)$$

with $\dot{x}_{sd} = \frac{1}{2b} v_s - \frac{\lambda_s}{p + \lambda_s} \frac{1}{2b} F_s$ Similarly, the operator unit dynamics are defined as:

$$\dot{x}_m = -\frac{\lambda_m}{p + \lambda_m} \frac{1}{2b} v_m + \frac{p + \lambda_m \frac{B_m}{2b}}{(p + \lambda_m)^2} \frac{1}{m_m} F_m \quad (14)$$

$$u_m = \frac{\lambda_m}{p + \lambda_m} F_m$$

and:

$$\dot{x}_m = \frac{\lambda_m}{p + \lambda_m} \dot{x}_{md} + \frac{p}{(p + \lambda_m)^2} \frac{1}{m_m} F_m \quad (15)$$

with $\dot{x}_{md} = -\frac{1}{2b} v_m + \frac{\lambda_m}{p + \lambda_m} \frac{1}{2b} F_m$ while communications may be described by:

$$v_m = u_s(t - T) \text{ and } v_x = u_m(t - T) \quad (16)$$

Given the above relationship, the three remaining tuneable parameters are the respective master and salve controller bandwidths $\lambda_m$ and $\lambda_s$ and the wave impedance b. As noted, the bandwidths are primarily used to create a predetermined apparent stiffness at both sides of the system. The wave impedance, conversely, determines the overall system characteristics. In particular, a detailed analysis of the relationship of characteristics leads to the following overall system parameters:

Total inertia: $M = M_m + bT + M_s$ (17)

Apparent damping: $B = 2b$

Steady state stiffness: $K^{-1} = K_m^{-1} + \left(\frac{b}{T}\right)^{-1} + K_s^{-1}$ Note that stiffness herein only describes the ratio of steady state force to position offset and does not imply the existence of an immediate force feedback. Such an immediate force feedback is impossible given the delay T in transmission.

On the basis of the above parameters, it becomes clear how the wave impedance b effects the system. Large values provide high stiffness at the expense of large inertia and damping elements. Such high stiffness implies a good response or telepresence may be achieved, yet the speed of motion of the system is limited by the excessive damping. In contrast, small impedance values result in low stiffness and provide little telepresence, but the correspondingly low damping and inertia parameters will allow fast movement of the manipulators. Thus, wave impedance presents a simple tuning device which the operator may use to vary system behavior between high-speed and poor force feedback versus low speed and good force feedback.

Furthermore, the above parameters reveal the effect of time delay. Increasing delays generates larger inertias and reduces the stiffness. Thus, the feeling of telepresence or response is degraded smoothly and relatively linearly according to this invention. The response of the system in extreme cases, no contact and rigid contact, may be illustrated by the following equations. In the first case in which there is no contact, where $F_s=0$, the following equation governs:

$$\frac{x_s}{x_m} = \frac{B_m}{2b} \frac{\lambda_s}{p + \lambda_s} \frac{p + \lambda_m}{p + \lambda_m \frac{B_m}{2b}} e^{-pT} \quad (18)$$

It is assumed that the initial master and slave positions are identical. Otherwise, a constant offset of positions will result as movement of one occurs relative to the other. For the other extreme in which rigid contact occurs, and $\dot{x}_s=0$, the following equation governs:

$$\frac{F_s}{F_m} = \frac{B_s}{2b} \frac{\lambda_m}{p + \lambda_m} \frac{p + \lambda_s}{p + \lambda_s \frac{B_s}{2b}} e^{-pT} \quad (19)$$

By comparing these two responses, it is clear that the system provides nearly identical performance from both force and position control, thus eliminating the need for making a choice between force or position control during operation.

Using the above described basic wave transmission concept according to this invention, by replacing the impedance controller at the master location with a force controller, the localized master dynamics become:

$$\dot{x}_m = -\frac{2\lambda_m}{p + 2\lambda_m} \frac{1}{2b} v_m + \frac{1}{p + 2\lambda_m} \frac{1}{m_m} F_m \quad (20)$$

$$u_m = \frac{2\lambda_m}{p + 2\lambda_m} F_m + \frac{p}{p + 2\lambda_m} v_m$$

The above equation illustrates the existence of high frequency wave reflections as discussed herein. Note that the bandwidth $\lambda_m$ wave impedance b are no longer independent. Rather, they are related by the following equation:

$$\lambda_m = \frac{b}{m_m} \quad (21)$$

However, except for the master unit stiffness, the overall system parameters remain similar and may be characterized as follows:

Total inertia: $M = bT + M_s + M_m$ (22)

Apparent damping: $B = 2b$

Steady state stiffness: $K^{-1} = \left(\frac{b}{T}\right)^{-1} + K_s^{-1}$

Thus, for large delays, the removal of impedance control on the operator side has no advantage. For small delays and limited controller gains, however, the use of force control increases the steady state stiffness and may prove advantageous.

Note that the wave transformation system according to this invention may be utilized in a variety of teleoperational applications beyond the mere connection of manipulators. It is common for robot controllers to incorporate knowledge of a desired joint or end point acceleration, especially if they are to be used for tracking purposes. This knowledge enables prediction of control torques required to sustain the desired motion. Using feedforward components, this structure allows considerable improvements in tracking performance.

Providing a desired acceleration is a relatively straightforward procedure assuming that the desired motion is known apriori or is generated by some external source without direct feedback to this source. Filtering of the signal produces a smooth motion with known derivatives. Stability is not effected in this "open loop" structure as the desired trajectory is generated.

Figure 13:
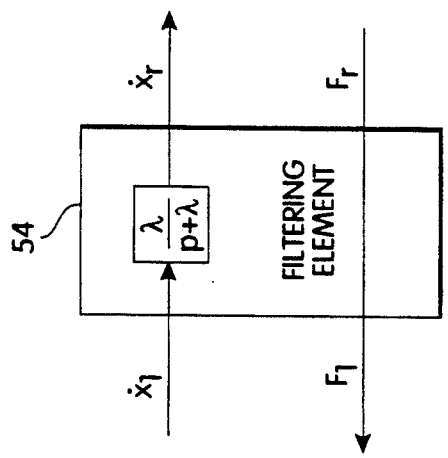
FIG. 13 is a representation of a standard filtering element applied to velocity and force data.

However, in teleoperation, force reflection establishes a feedback connection to the motion generating device. This forms an additional control loop around the system. However, this additional loop also introduces additional stability issues to the control system. In particular, filtering the motion signal adds significant phase lag to the system and raises the risk of severe stability problems. Thus, a filtering element within a closed loop system may be depicted as shown in FIG. 13. The power flow into this element is governed as follows:

$$P = \dot{x}_l^T F_l - \dot{x}_r^T F_r = \left(\frac{1}{\lambda}\ddot{x}_r + \dot{x}_r\right)^T F_l - \dot{x}_r^T F_r = \frac{1}{\lambda}\ddot{x}_r^T F_l \quad (23)$$

Figure 14:
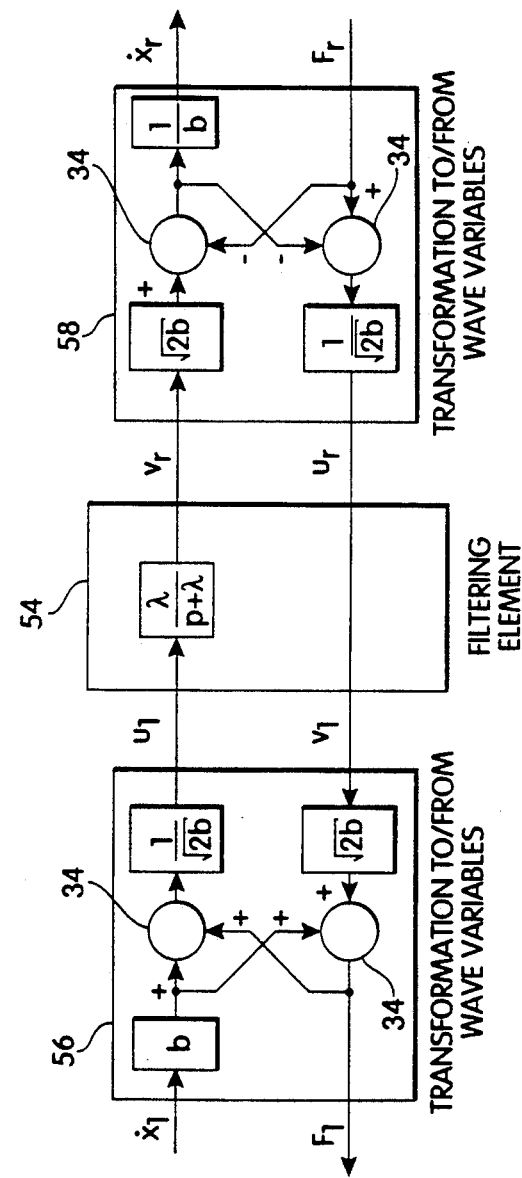
FIG. 14 is a block diagram illustrating the transformation of velocity and force data to and from wave variables for filtering according to the filtering element of FIG. 13.

Without further information about this system, the power flow may provide energy to the system. The filtering element 54 is, thus, not passive and may destabilize the system. Note that the filter may be located either in the forward path or feedback path of the overall system without effecting the passivity concerns. Since slow filters are somewhat like pure time delays, it is equally possible to perform filtering within the wave variable domain. FIG. 14 illustrates a wave transformation system for a filtering element. By filtering a wave the system maintains passivity. The wave transformation blocks 56, 58 are similar to those shown in the transmission model of FIG. 4. In particular, the filter wave variables $u_l$, $u_r$ and $v_l$, $v_r$ are governed by the following equation:

$$\dot{v}_r + \lambda v_r = \lambda u_l \tag{24}$$

This relationship provides the power flow through the filter of:

$$P = \frac{1}{2} u_l^T u_l - \frac{1}{2} v_l^T v_l + \frac{1}{2} u_r^T u_r - \frac{1}{2} v_r^T v_r = \tag{25}$$

$$\frac{1}{2\lambda^2} \dot{v}_r^T \dot{v}_r + \frac{d}{dt} \frac{1}{2\lambda} v_r^T v_r$$

which satisfies the above discussed passivity conditions in which power is either stored or dissipated.

Figure 15:
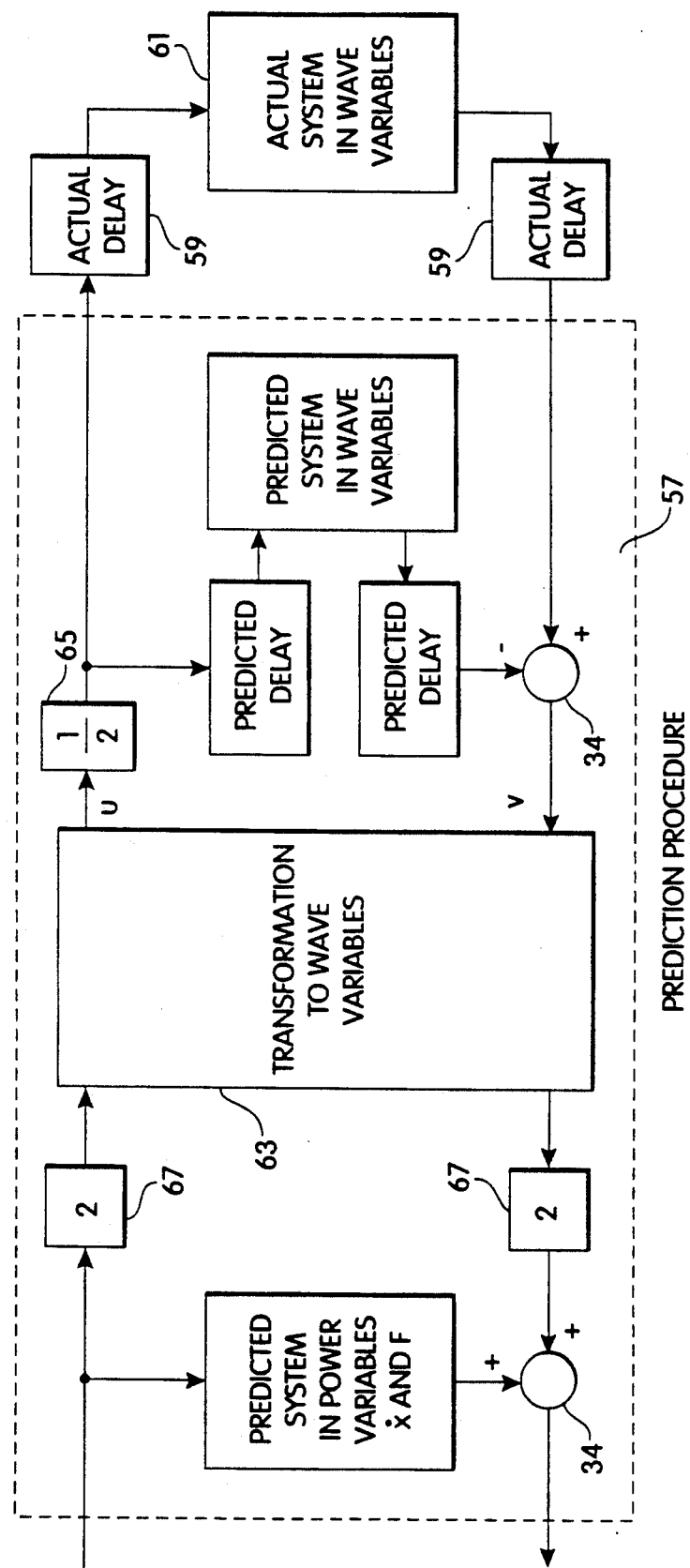
FIG. 15 is a block diagram of a prediction system including a wave variable transform block according to this invention.

As noted above, teleoperation is primarily designed for dealing with unknown and unstructured environments. However, in many situations, the user may, in fact, have some knowledge of the behavior of the remote system. If such knowledge is present, then the system may be adapted to predict the remote response of the slave unit and included into an immediate feedback loop to the operator. This immediate feedback relieves the operator of added difficulties resulting from time delays. One such system 57 providing stable predictions for immediate feedback to the operator is shown in FIG. 15. This system uses concepts similar to Smith predictors to feed back the predicted response immediately as well as a prediction error after the real response resulting from actual delay 59 to and from the remote slave system 61 has been measured. The stability of Smith predictors relies strongly upon the accurate modeling of the dynamics of the remote slave unit 61 and adequate cancellation of the system response allowing the system to obtain negligible prediction error. Any remaining prediction errors must be treated as simple disturbances to which the operator controller must be sturdy enough to remain uneffected. Thus, Smith predictors are not passive.

To stabilize the prediction, it should be computed in wave variables (63) according to this invention as shown in FIG. 15. Stability is maintained if the returning wave v (representing the prediction error) is of a magnitude less than that of the outgoing wave u which commands both the prediction and the actual system. Such a relationship is achieved if the outgoing wave amplitude u is reduced by one-half 65. To compensate for the reduction in wave amplitude, a passive unit changing element 67 may be inserted into the power variables ($\dot{x}$, F) before transformation.

According to this invention, the system is always stable, regardless of prediction errors, and consequently results in modification of the system dynamics even in the case of a perfect prediction. In the case of perfect predictions, the returning wave equals zero and the wave transformation mimics a damping element. Like other structures defined herein, this system endows the user with substantial freedom in the choice of individual system elements. For example, the choice of the actual transmission scheme involves impedance matching and a selection of force and position control. This allows a wide variety of possible control structures which can be tailored based upon the innate requirements of the operator the manipulators, and the environment.

Figure 16:
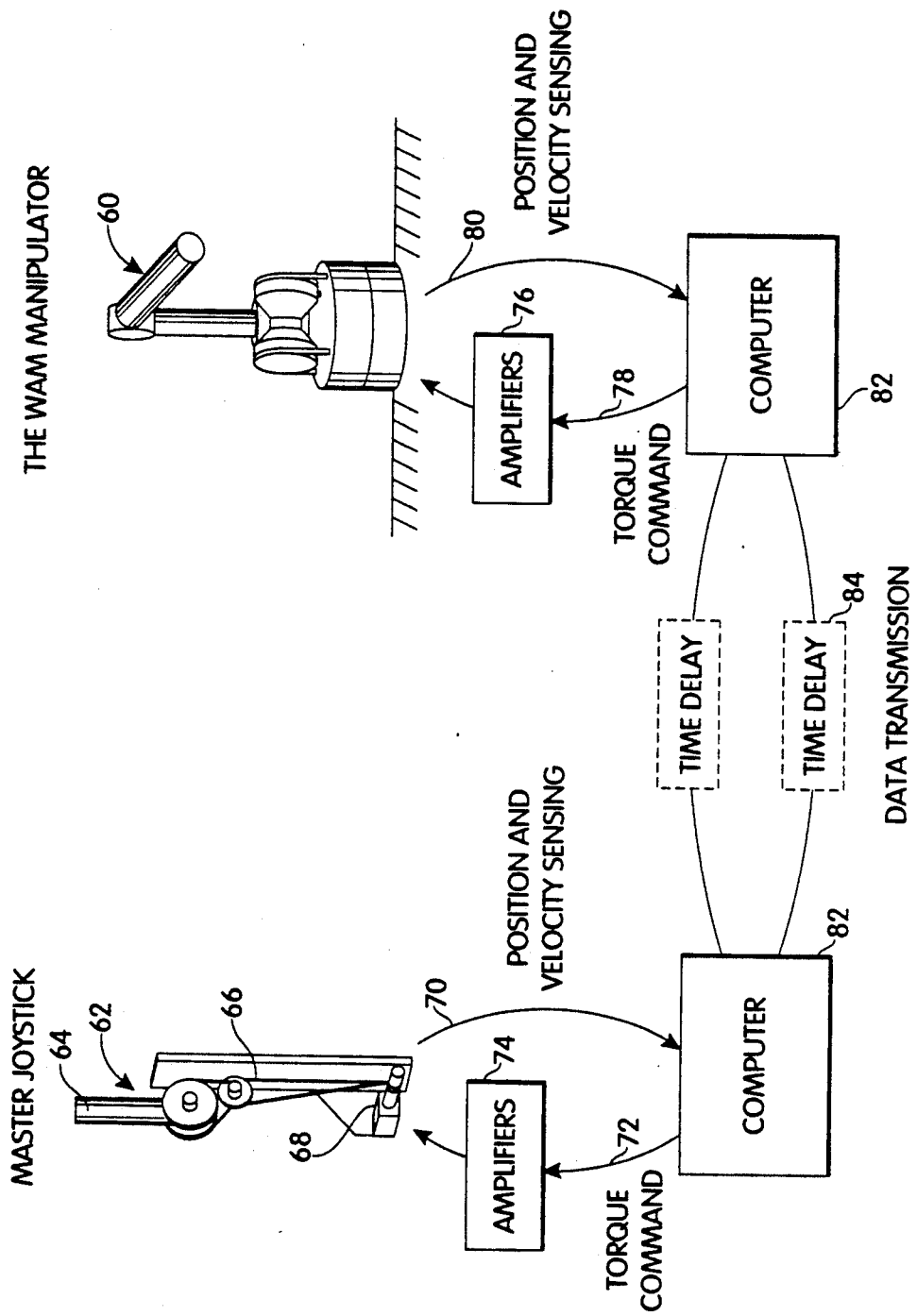
FIG. 16 is a somewhat schematic diagram of a simulation of a telerobotic system having transmission time delays according to this invention.

The response graphs provided herein were the result of simulations utilizing wave transformations in the presence of time delays. One such simulation system is depicted in FIG. 16. The system comprises a Whole Arm Manipulator (WAM) 60. In this embodiment, the WAM 60 is a cable-driven light weight four degree of freedom manipulator designed to be apparently backdrivable and is thus ideally suited for teleoperation even without explicit force sensing. Note, that in this example, position sensing is used to determine the action state of the manipulator rather than force sensing. Thus, the system corresponds largely to that shown in block diagram in FIG. 11. A master joystick 62 is also provided having a handle 64 for interphase with a operator and utilizing cables 66 to interconnect with a servomotor 68. The servomotor transmits velocity and position data from the stick 64 via a data line 70 and receives torque commands through a second data line 72 that is amplified 74 in order to generate the necessary feedback force to the servomotor 68 to be felt by the operator within his joystick 64. A similar amplifier system 76 is provided the wham 60 which includes an input data line 78 and positioned in velocity output data line 80. The computer 82 shown at either end of the system may, in fact, be a single VME Bus based computer system including several processor boards, D/A and A/D converters as well as multiple parallel ports for interface. In this example, a sun work station may be utilized to interphase and control the simulation. The time delay 84 is provided internally within the computer. The time delay, in this example, involves the use of software buffers. Sampling rates utilized in this simulation varied between 200 Hz and 4 KHz for different control loops. In reference to FIG. 11, the computer blocks 82 may be said to perform the function of each of the wave transformations 30, 32 and impedance controllers 52, 54. Each of the data lines 70, 72, 78 and 80 were interphased with appropriate computer ports via A/D and D/A converters.

The preceding has been a detailed description of the preferred embodiments. Other alternatives and equivalents are possible according to this invention and are contemplated as falling within the spirit and scope of the invention. The invention is not taken to be limited by the preceding description which should be considered only by way of example.

What is claimed is:

1. A system for transmitting data representing an action and responsive data representing a reaction in the presence of a time delay comprising:

means for transmitting data between a first point and a remote second point, including a time delay therebetween;

means for transforming action command at a first point into data in a form of a first wave representation;

means for receiving and transforming the first wave representation into an action command at a second remote point;

means at the second remote point for detecting an action state resulting from the action command;

means for transforming the action state into data in a form of a second wave representation;

means at the first point for transforming a received second wave representation into a sensed state; and wherein the wave representation of the action command comprises a wave amplitude u and the wave representation of the action state comprises a wave amplitude v and wherein each of u and v comprise the equations $$u = \frac{1}{\sqrt{2b}} (F + b\dot{x}), v = \frac{1}{\sqrt{2b}} (F - b\dot{x})$$

wherein b equals a characteristic wave impedance, F equals a force transmitted as the action state and $\dot{x}$ equals a velocity transmitted as the action command.

2. A system as set forth in claim 1 wherein the first point includes a master manipulator unit for interface with an operator and the second point includes a remote slave manipulator unit for interacting with an environment.

3. A system as set forth in claim 1 wherein at least one of the master manipulator unit and the remote slave manipulator unit include an impedance controller for matching impedance thereof to that of the characteristic wave impedance b.

4. A system as set forth in claim 3 further comprising means for transforming each of the wave amplitudes u and v into position-relative values based upon sensed force information at each of the master and the remote slave units.

5. A system as set forth in claim 1 wherein the time delay between the first point and the remote second point includes a time delay resulting from a filtering element.

6. A method of transmitting data representing an action an responsive data representing a reaction in the presence of a time delay comprising the steps of:
transmitting data between a first point and a remote second point having a time delay in transmission therebetween;
transforming action commands at the first point into data in a form of a first wave representation;
receiving and transforming the wave representation into an action command at the second remote point;
detecting an action state resulting from an action command at the second remote point;
transforming the action state into data in a form of a second wave representation;
transforming a received second wave representation into a sensed state at the first point; and
wherein the step of transforming the action command includes defining of an amplitude u and the step of transforming an action state includes defining an amplitude v wherein each of u and v comprise the equations $$u = \frac{1}{\sqrt{2b}} (F + b\dot{x}), v = \frac{1}{\sqrt{2b}} (F - b\dot{x})$$

wherein b equals a characteristic wave impedance, F equals a force transmitted as the action state and $\dot{x}$ equals a velocity transmitted as the action command.

7. A method as set forth in claim 6 wherein the first point includes a master manipulator unit for interfacing with an operator and the second point includes a remote slave manipulator unit for interacting with an environment.

8. A method as set forth in claim 6 further comprising matching impedance of at least one of the first point and the second point to the characteristic wave impedance.

9. A method as set forth in claim 8 further comprising tuning of the impedance of at least one of the first point and the second point to optimize system response.

10. A method as set forth in claim 9 wherein the step of tuning includes controlling impedance of a manipulator at at least one of the first point and the second point, the controlling including defining a transfer function of force transmitted as the action state versus desired velocity input as the action command $\dot{x}_d$ equal to:

$$\frac{F}{\dot{x}_d} = R + \frac{(Bp + K)(mp + D)}{mp^2 + (B + D)p + K}$$

wherein p is a Laplace operator, K is a position gain equal to a predetermined bandwidth of the manipulator times a controller damping value B, and wherein B is an environmental damping value relative to the manipulator D, m is an equivalent mass of the manipulator and wherein R is a differential damping value equal to $b - B$.

11. A method as set forth in claim 6 further comprising the step of transforming each of the wave amplitudes u and v into position-relative values based upon sensed force information at each of the first point and the second point.

12. A method of transmitting data and of receiving responsive data in the presence of a time delay comprising:
providing a force value and a position value input at a first location;
transforming a combination of the force value and the position value at the first location into a first wave representation;
transmitting the first wave representation to a second location remote from the first location and receiving the first wave representation at the second location;
establishing one of a force value and a position value at the second location;
deriving one of a new force value and a new position value at the second location based upon a combination of the first wave representation with, respectively, one of the established position value and the established force value;
transforming one of a combination of the new force value and the established position value and a combination of the established force value and the new position value at the second location, respectively, into a second wave representation;
transmitting the second wave representation from the second location and receiving the second wave representation at the first location;
establishing one of a force value and a position value at the first location; and
deriving one of a new force value and a new position value based upon a combination of the second wave representation with, respectively, one of the established position value and the established force value at the first location, respectively.

13. A method as set forth in claim 12 wherein the first wave representation comprises a wave amplitude u and the second wave representation comprises a wave amplitude v and wherein each of u and v comprise the equations $$u = \frac{1}{\sqrt{2b}} (F + b\dot{x}), v = \frac{1}{\sqrt{2b}} (F - b\dot{x})$$

wherein b equals a characteristic wave impedance, F equals a provided force value input and $\dot{x}$ equals a velocity derived from a provided position value input.

14. A method as set forth in claim 12 wherein the second wave representation comprises a wave amplitude u and the first wave representation comprises a wave amplitude v and wherein each of u and v comprise the equations $$u = \frac{1}{\sqrt{2b}}(F + b\dot{x}), v = \frac{1}{\sqrt{2b}}(F - b\dot{x})$$

wherein b equals a characteristic wave impedance, and F and x equal, respectively, one of the new force value and a velocity derived from the established position value at the second location and the established force value and a velocity derived from the new position value at the second location.

15. A system as set forth in claim 12 wherein the first wave representation comprises a wave amplitude u and the second wave representation comprises a wave amplitude v and wherein each of u and v comprise the equations $$u = \frac{1}{\sqrt{2b}}(F + b\dot{x}), v = \frac{1}{\sqrt{2b}}(F - b\dot{x})$$

wherein b equals a characteristic wave impedance, and F and $\dot{x}$ equal, respectively, one of the new force value and a velocity derived from the established position value at the first location and the established force value and a velocity derived from the new position value at the first location.

16. A method as set forth in claim 12 further comprising filtering force and position values transmitted between the first location and the second location.

17. A telerobotic system operating in the presence of a time delay comprising:
a master unit that provides a force value and a position value input;
a wave transformation element that combines the force value and the position value from the master unit into a first wave representation;
a transmitter that transmits the first wave representation from the master unit to a remote slave unit, the slave unit receiving the first wave representation and the slave unit establishing one of a present force value and a present position value at the slave unit;
a force value updating element at the slave unit that derives one of a new force value and a new position value based upon a combination of the first wave representation with, respectively, one of the established present position value and the established present force value at the slave unit;
a wave transformation element at the slave unit that transforms one of a combination of the new force value and the established present position value and a combination of the established force value and the new position value at the slave unit, respectively, into a second wave representation;
a transmitter at the slave unit that transmits the second wave representation from the slave unit to the master unit, the master unit establishing one of a present force value and a present position value at the master unit; and
a force value updating element at the master unit that derives one of a new force value and a new position value at the master unit based upon a combination of the second wave representation with, respectively, one of the established present position value and the established present force value at the master unit, respectively.

18. The telerobotic system as set forth in claim 17 wherein each of the first and second wave representations are based upon a characteristic wave impedance b.

19. The telerobotic system as set forth in claim 18 wherein each of the master unit and the slave unit include a manipulator that interacts with an environment.

20. The telerobotic system as set forth in claim 19 further comprising an impedance controller located between the manipulator and the slave unit, the impedance controller matching the impedance b to a characteristic impedance of the manipulator.

21. The telerobotic system as set forth in claim 20 wherein the impedance controller controls impedance based upon gains that are selected based upon inertial differences between the manipulator of the master unit and the manipulator of the slave unit, environmental damping acting upon the manipulator of the slave unit, internal impedance controller damping, and internal manipulator frictional damping.

22. The telerobotic system as set forth in claim 18 further comprising a prediction element located at each of the master unit and the slave unit, the prediction unit providing at least one of a predicted new position value and a predicted new force value to be received by one of the master unit and the slave unit in response, respectively, to data transmitted by one of the slave unit and the master unit.

* * * * *